July 27, 1937.  R. R. STEVENS  2,088,180
PACKING
Filed Nov. 3, 1934  2 Sheets-Sheet 2

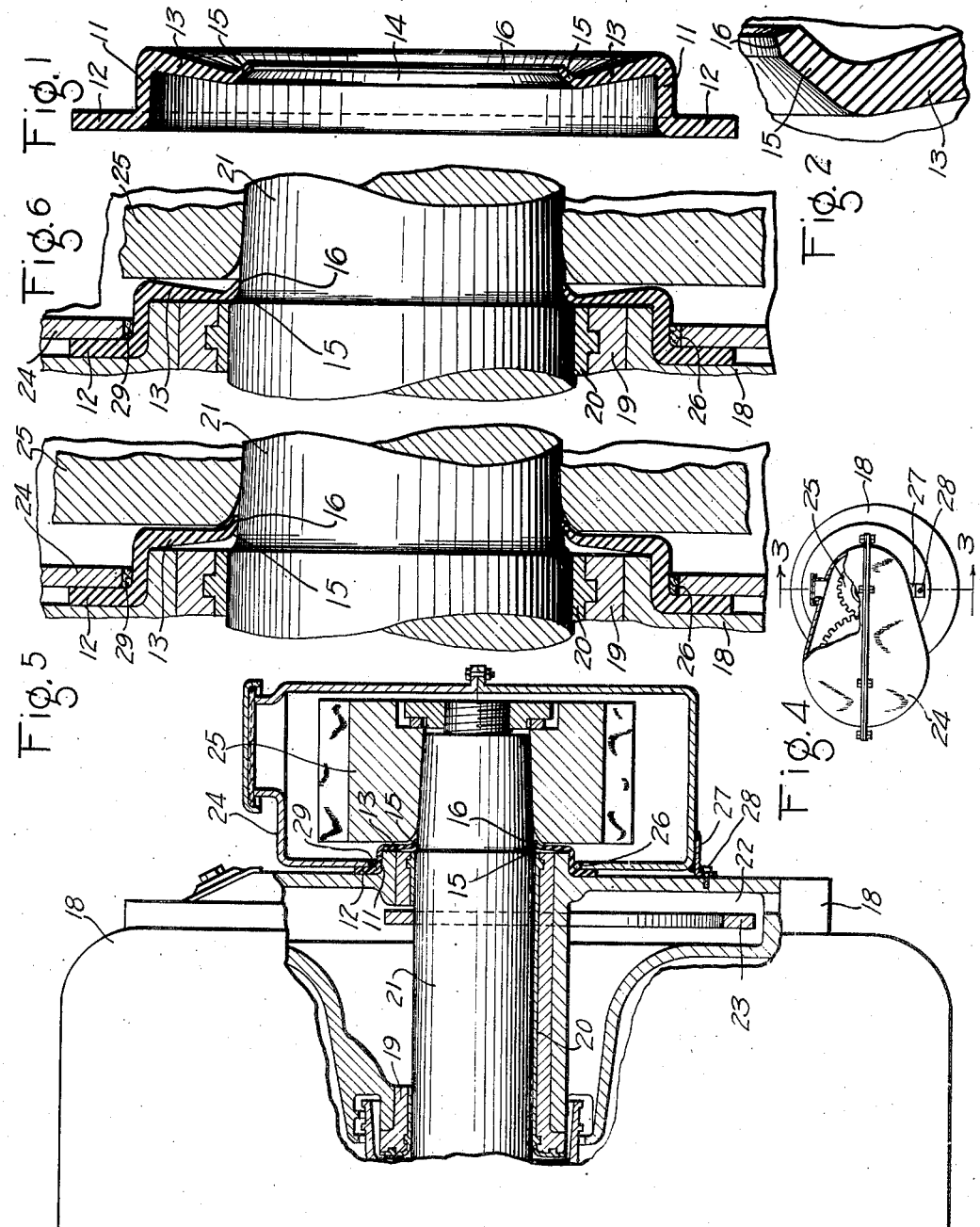

INVENTOR
ROY R. STEVENS.
BY Wm. M. Cady
ATTORNEY

Patented July 27, 1937

2,088,180

UNITED STATES PATENT OFFICE 2,088,180

PACKING

Roy R. Stevens, Forest Hills, Pa., assignor to The Westinghouse Air Brake Company, Wilmerding, Pa., a corporation of Pennsylvania Application November 3, 1934, Serial No. 751,334

7 Claims. (Cl. 288—1)

This invention relates to packings, and particularly to packings for effecting a seal at the periphery of a rotating shaft.

One type of packing, now in commercial use, for effecting a seal at the periphery of a rotating shaft comprises a flat substantially rigid body of molded or other composition material, having an opening therein through which a shaft may extend, the body of the packing having an integrally formed axially extending annular sealing lip defining the opening, which annular lip is of resilient character and which, being biased radially outwardly when the shaft is disposed in the opening, maintains continuous contact with the shaft.

This type of packing is satisfactory in respect to maintaining an effective seal at the shaft only as long as the annular sealing lip retains its resiliency. After the annular lip loses its resiliency due to aging of the material or due to the fact that the material absorbs oil or other lubricant, to which the lip may be subjected, which tends to harden and stiffen the lip, it is incapable of maintaining a tight and effective seal at the outer surface of the shaft. Furthermore, after the annular lip loses its resiliency and becomes hardened or stiffened, it may burst or crack open due to the continued outward biasing pressure exerted thereon by the shaft, and the sealing characteristics of the packing are thus entirely lost.

It is an object of the present invention to provide a packing having improved characteristics as compared to the above mentioned type of packing, which improved characteristics enable the packing to more effectively perform its sealing function, and which greatly increase the life of the packing.

Figure 8:
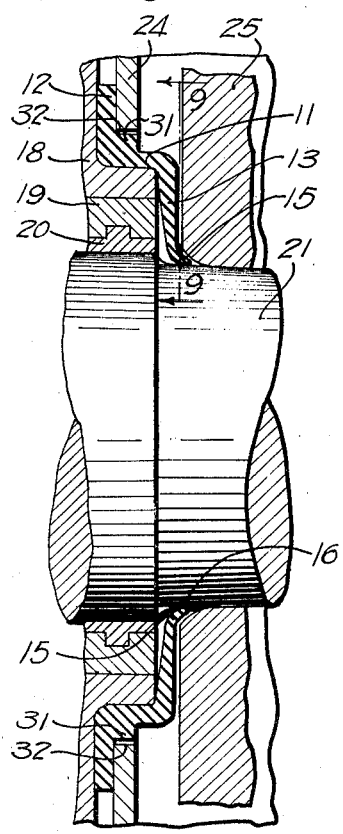
Figure 7:
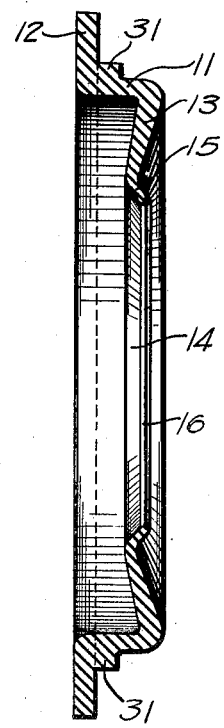
Figure 9:
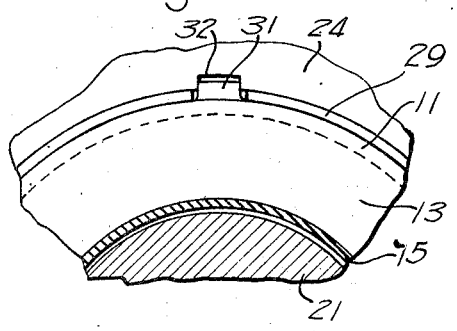

The above and other objects of my invention which will be made apparent hereinafter, are attained by means of illustrative embodiments of my invention, described hereinafter and shown in the accompanying drawings, wherein, Figure 1 is a sectional view of a packing representing one embodiment of my invention, showing its form in the free position or condition thereof, that is, while disassociated from the shaft, Figure 2 is an enlarged fragmentary view, showing in detail the construction and contour of the annular sealing lip of the packing shown in Figure 1, Figure 3 is a fragmentary view of the end portion of a motor, partially in section, and illustrating the application of one embodiment of my invention thereto, Figure 4 is an end view, in reduced size, corresponding to Figure 3, and having indicated thereon line 3—3 on which the section in Figure 3 is taken, Figure 5 is an enlarged fragmentary sectional view, showing in detail the position of the sealing flange of the packing, upon first installation on a shaft, Figure 6 is a view showing the position of the sealing flange of the packing, after wear on the annular sealing lip of the packing or wear on the shaft has occurred, Figure 7 is a sectional view of a modified form of packing embodying my invention, when in the free condition or position thereof disassociated from a shaft, Figure 8 is a view similar to Figure 5, illustrating an application of the modified form of packing, shown in Figure 7, and Figure 9 is a fragmentary view, taken on line 9—9 of Figure 8.

A packing, constituting the one embodiment of my invention shown in Figure 1, is of one-piece molded construction and of any suitable resilient material such as rubber or rubber composition, and comprises a cylindrical portion 11 terminating at one end in a flat annular outwardly extending securing flange 12, the cylindrical portion 11 terminating at the opposite end in an inwardly extending annular sealing flange 13 of conical shape tapering in thickness toward a central opening 14, and terminating in a sealing lip 15, which may be of resilient expansible character or relatively rigid as desired, the inclination of the flange 13 being toward the securing flange 12 and the inclination of the sealing lip 15 being in a reverse direction away from the securing flange 12. The sealing lip 15 has a contact surface 16 formed thereon which is adapted to conform to the contour of the shaft in connection with which the packing is employed and to have a maximum area thereof in contact with the shaft when in the installed position on the shaft, as hereinafter described.

One application of the above described packing is illustrated in Figures 3, 4, 5, and 6, wherein is shown an electric motor having a casing 18 adapted to support a journal 19 having a bearing 20 secured thereto, which bearing is adapted to support the armature shaft 21 of the motor along a portion thereof, the end of the shaft 21 projecting exteriorly of the casing 18. Formed in the casing 18 is a chamber 22 for containing fluid lubricant which is supplied to the bearing 20 by means of an oil ring 23 in well known manner.

Upon installation, the packing shown in Figure 1 is fitted over the exteriorly projecting end of the shaft 21 and the securing flange 12 of the packing clamped against the end wall of the casing 18 of the motor by any suitable means. For example, as shown in Figure 3, the securing flange 12 of the packing may be clamped against the casing 18 of the motor by a sectional casing 24 adapted to receive and contain a supply of lubricant for a driving gear mechanism enclosed therewithin, the gear mechanism including a pinion gear 25 suitably secured to the end of the shaft 21 of the motor after the packing is fitted over the end of the shaft.

The sectional casing 24 is provided with an opening 26 therein enabling the casing to fit around the cylindrical portion 11 of the packing for holding the securing flange 12 of the packing firmly against the casing 18 of the motor and may be supported or secured in position in any suitable manner, as by one or more angle brackets 27 welded thereto and secured to the motor casing 18 by screws 28. A felt or fibrous liner 29, suitably interposed between the cylindrical portion 11 of the packing and the edge of the opening 26 in the sectional casing 24 serves to prevent cutting of the packing by the sectional casing and also to prevent leakage of the lubricant out of the sectional casing through the opening therein.

It will be noted that the tapered end of the shaft 21 is of such varying diameter that as the securing flange 12 of the packing is pressed toward the end wall of the casing 18 of the motor, the sealing lip 15 on the packing engages the surface of the shaft before the securing flange 12 engages the end wall of casing 18, and therefore when the securing flange is moved further and into engagement with the end wall of casing 18, the conical sealing flange 13 of the packing is bent outwardly in the direction of its axis into a conical contour facing in a direction opposite to that which it faced in the free position of the packing. It will be noted also that as the conical sealing flange passes through a plane perpendicular to its axis as the sealing flange is being bent from the free position thereof to the installed position thereof as just described, the cylindrical portion 11 of the packing may expand radially outwardly to prevent distortion of the sealing flange.

In the installed position of the packing, therefore, the shaft prevents the return of the sealing flange 13 of the packing to its free position and thereby causes tension to be created or set up in the sealing flange and in the cylindrical portion 11 of the packing, which tension tends to return the sealing flange to its free position. Thus the sealing lip 15, which tends to return with the sealing flange in an arc that extends beneath the surface of the shaft, is continuously and resiliently wedged in an axial direction into sealing contact with the shaft, to prevent access of lubricant in the gear mechanism casing 24 to the bearing 20, which lubricant is of such consistency as to interfere with the proper lubrication of the bearing by the lubricant supplied from the chamber 22.

In the installed position of the packing, as shown in Figure 5, the angular position of the sealing lip 15 is such that the contact surface 16 thereon is substantially parallel to the outer surface of the shaft so that a maximum area thereof engages in sealing contact with the shaft.

While the exteriorly projecting portion of the shaft 21 is shown in the drawings as being tapered, it should be understood that this portion of the shaft may be also be partly tapered and partly cylindrical or entirely cylindrical, it being necessary in any case to have the projecting end portion of the shaft of sufficient diameter to prevent the return of the conical sealing flange 13 to its free position when bent in an axial direction out of its free position. It is desirable to have at least a portion of the projecting end of the shaft tapered for enabling the initial entry of the shaft into the opening 14 of the packing, so that the sealing flange may be bent uniformly and easily into its installed position.

As wear on the contact surface 16 of the sealing lip 15 develops, due to rotation of the shaft, or as wear on the shaft occurs at the point of contact with the contact surface 16, the tension acting on the flange 13 of the packing is effective to return the flange 13 in an axial direction toward the free position thereof to thereby maintain the sealing lip 15 constantly in sealing engagement with the surface of the shaft. The position of the flange 13 of the packing, after wear on the sealing lip or on the shaft has permitted recession of the flange 13 toward its free position, is shown in Figure 6. In this connection, the advantage of a tapered shaft over a cylindrical or straight shaft is that as the sealing flange recedes toward its free position it wedges against an increasing diameter of shaft.

A modified form of packing embodying my invention is shown in Figure 7 and differs from that shown in Figure 1, in the provision of integrally formed projections 31 extending radially outward from the outer surface of the cylindrical portion 11 of the packing, which projections 31 are adapted to enter into suitable recesses 32 in the clamping means for securing the flange 12 of the packing to the casing of the motor, the packing being thereby secured against the possibility of rotation with the shaft without excessive clamping pressure on the clamping flange 12 tending to distort the packing.

In view of the fact that it is the tension created in the packing tending to return the sealing flange 13 to its free position in an axial direction which is employed for maintaining or resiliently urging the sealing lip into contact with the shaft, it will be seen that resiliency in the sealing lip 15 itself is relatively non-essential and, therefore, that the sealing lip 15 may be made relatively non-resilient and of such character as to resist wear due to rotation of the shaft or as to resist bursting or cracking. For example, the sealing lip 15 may be constituted of different material than the main portion of the packing or of the flange 13. The sealing lip 15 may also be of relatively greater thickness than in prior packings to give greater wearing distance as compared to the sealing lips of prior packings. Furthermore, due to the relatively greater thickness of the material in the flange 13 as compared to the thickness of the sealing lip in prior packings, a stronger biasing force for maintaining the sealing lip in contact with the shaft may be obtained, the thicker section of material in the flange 13 also possessing the advantage of retaining its resiliency for a longer period of time than the relatively thin section of material in the sealing lip of prior packings, both because of greater resistance to aging or hardening and because the flange 13 is not subjected to the weakening effect of reduction in thickness due to shaft wear.

It will, therefore, be seen that the above described packings embodying my invention produce a more effective seal than prior packings and in addition possess a longer life than prior packings.

It will be understood that while the packings embodying my invention are illustrated as employed for the purpose of preventing access of improper lubricant from the gear mechanism casing 24 to the bearing 20, they may be employed as well for preventing access of other elements, such as dust or dirt particles, to a chamber, along a shaft extending into the chamber. Furthermore, although but two embodiments of my invention are shown and described, it should be understood that my invention is capable of other changes, omissions, or additions without departing from the spirit thereof. I do not desire, therefore, that any limitation as to the scope of my invention be imposed, except as necessitated by the prior art and as defined in the appended claims.

Having now described my invention, what I claim as new and desire to secure by Letters Patent, is:

1. A packing of resilient material comprising an annulus having a radially extending portion provided with a central opening for receiving a shaft, said annulus, as manufactured, being formed with said portion extending at an acute angle to the axis of the annulus in one direction, said packing being so constructed and arranged that when it is in working position on the shaft said portion is deformed to assume an acute angle to said axis in the opposite direction and thereby so tensioned as to resiliently wedge the defining surface of the central opening into sealing contact with the shaft.

2. A packing, of resilient material comprising a conical portion having a central opening therein for receiving a shaft and terminating at the central opening in a sealing lip, said conical portion facing in one direction in the free position thereof and being disposed into working position by being bent in an axial direction into a conical contour facing the opposite direction and thereby so tensioned as to resiliently wedge the sealing lip in the reverse axial direction into contact with a shaft in the said opening.

3. A packing, of resilient material, comprising a conical portion having a central opening therein for receiving a shaft and terminating at the central opening in a resilient sealing lip adapted to expand radially upon entry of a shaft into the opening, said conical portion facing in one direction in the free position thereof and being disposed into working position by being bent in an axial direction into a conical contour facing the opposite direction and thereby so tensioned as to resiliently wedge the sealing lip in the reverse axial direction into contact with a shaft in the said opening independently of the radially contracting tension in the sealing lip itself.

4. A packing, of resilient material, comprising a conical portion having a central opening therein for receiving a shaft and terminating at the central opening in a sealing lip, said conical portion facing in one direction in the free position thereof and being disposed into working position by being bent in an axial direction into a conical contour facing the opposite direction and thereby so tensioned as to resiliently wedge the sealing lip in the reverse axial direction into contact with a shaft in the said opening, said sealing lip having a contact surface thereon adapted to have a maximum area thereof in contact with the shaft when said conical portion is in the working position thereof.

5. A packing, of resilient material, comprising a conical portion having a central opening therein for receiving a shaft and tapering in thickness radially inwardly toward the central opening to terminate in a sealing lip, said conical portion facing in one direction in the free position thereof and being disposed into working position by being bent in an axial direction into a conical contour facing in the opposite direction and thereby so tensioned as to resiliently wedge the sealing lip in the reverse axial direction into contact with a shaft in said opening.

6. A packing, of resilient material, comprising a cylindrical portion adapted to have one end thereof stationarily secured, the other end of said cylindrical portion terminating in an inwardly extending conical sealing flange having a central opening therethrough for receiving a shaft, which sealing flange terminates at the central opening in a sealing lip, said sealing flange facing in one direction in the free position thereof and being disposed into working position by being bent at its jointure with the said cylindrical portion in an axial direction into a conical contour facing in the opposite direction, said cylindrical portion and said sealing flange being thereby so tensioned as to resiliently wedge the sealing lip in the reverse axial direction into sealing contact with a shaft in said opening and to cause the sealing flange to return toward its free position and maintain contact of the sealing lip with the shaft despite wear on sealing lip due to rotation of the shaft.

7. A packing of resilient material, comprising a cylindrical portion adapted to be secured at one end and the other end terminating in an inwardly extending sealing flange having a central opening for receiving a shaft and a sealing lip at the central opening for contacting a shaft in the opening, the said sealing flange being conical in shape and facing in such direction in the free form thereof that the sealing lip is positioned within the cylindrical portion, said sealing flange being bent at its jointure with the cylindrical portion in an axial direction into a working form in which it faces in the opposite direction and in which the sealing lip is positioned outside of the cylindrical portion, said cylindrical portion and said sealing flange being thereby so tensioned as to resiliently wedge the sealing lip in the reverse axial direction into sealing contact with a shaft in the opening.

ROY R. STEVENS.